3,110,273
TRANSPIRATION COOLED BOILER BAFFLE
Curtis C. Beusman, Mount Kisco, Leon Malin, Yonkers, and Willard S. Mott, White Plains, N.Y., assignors, by mesne assignments, to United Nuclear Corporation, New York, N.Y., a corporation of Delaware
Filed Sept. 22, 1960, Ser. No. 57,753
4 Claims. (Cl. 110—99)

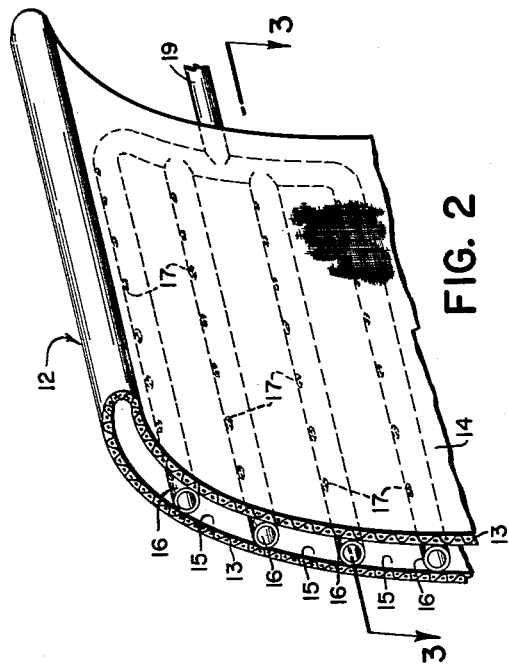
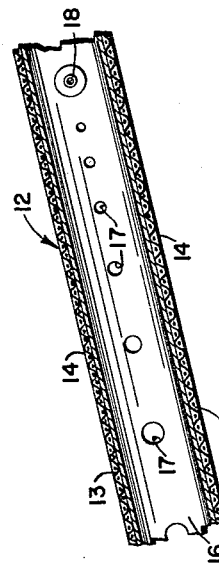
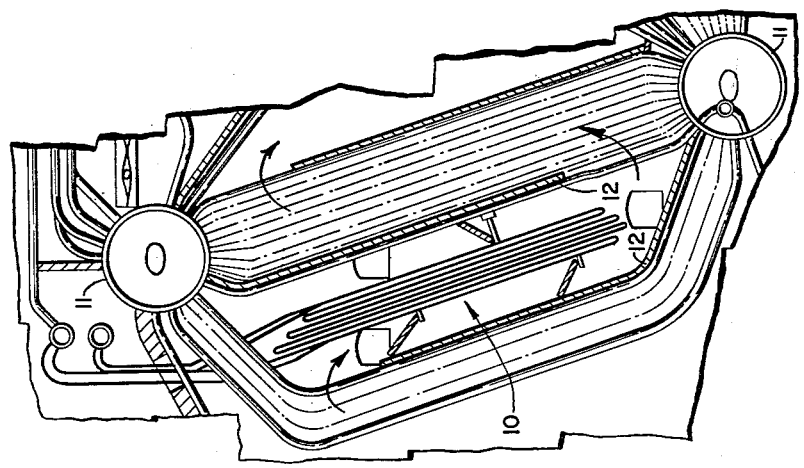

This invention relates to steam generating apparatus and more particularly to improved baffles for use in steam boilers.

Baffles are used in many types of boilers for deflecting and directing the flow of hot combustion gases. They are used, for example, to protect headers from the direct flow of hot gases. They are also used in superheat and other boiler regions to provide control of the directions of gas flow so that desired steam temperatures may be efficiently obtained.

Boiler baffles have often been made of heavy cast refractory materials. Positioning such baffles in crowded boiler zones such as superheat regions is difficult and separate structural members are often required to support them. Once installed, useful baffle life has been limited by the ability of the baffle material to withstand erosion and corrosion effects of the high temperature combustion gases and recasting for replacement is frequently required.

Baffles have also been provided by blocking the spaces between adjacent tubes in, for example, one or more rows of boiler elements adjoining superheat zones thus providing walls to channel gas flow. Such an arrangement performs very well. But it is also of limited life because of the erosion and corrosion effects mentioned.

The purpose of this invention is to provide boiler baffles which can be easily installed which are light weight yet strong and self supporting and which will have long service lifetimes in the extreme environment of hot combustion gases.

According to the present invention hollow baffles are provided having porous outer walls. The baffles, which can be fabricated in any desired shape and size, have channels arranged inside the porous walls through which a coolant fluid is circulated. The channels lead to the inner side of the porous baffle walls to permit cooling of the baffles by transpiration. Coolant fluid is supplied, with suitable plumbing arrangments, to the channels where it circulates and passes through the walls cooling the outer surfaces of the baffles before being swept along in the gas stream.

Coolant flow rates required for the baffles of this invention are not large and the amount of coolant released to the gas stream is insufficient to affect combustion gas composition. As the porous baffle walls transpire, a moving buffer film of coolant is established at the outer surface of the baffle. The baffle surface is cooled, minimizing local activity of corrosive agents in the combustion gas and particulate matter in the combustion gas is deflected so that the baffle does not become eroded.

Many coolant fluids, either gases or liquids, may be used in this invention. Air is particularly advantageous because of its availability and because of availability of conventional equipment for supplying it.

Of course, partial or total baffle deterioration alone is a rare cause for boiler shutdown. Instead, burn-out or erosion and accompanying reduced boiler efficiency are normally tolerated until a scheduled shutdown and general overhaul when baffles are replaced. But with the baffles of this invention such a compromise, viz., continuing operation at reduced efficiency rather than shutting down for baffle maintenance, is not necessary.

This is especially advantageous for superheater installations because boiler efficiency in a superheat steam cycle is critically related to maximum steam temperature. By using our new transpiration cooled baffles design conditions of combustion gas flow and hence of superheat steam temperature are assured during longer periods of boiler operation. Baffle performance can be maintained at optimum conditions throughout many overhaul cycles without necessity for replacement.

A particular embodiment of the invention is described in detail in the following paragraphs. For clarity, reference is made to the accompanying drawings in which:

FIG. 1 is a side view in section of a portion of a steam boiler showing baffles according to the present invention installed in a superheat region of a boiler;

FIG. 2 is an enlarged perspective view, partially in section showing a portion of the baffle in FIG. 1; and FIG. 3 is a section view of the baffle of FIG. 2 taken along line 3—3 of FIG. 2.

In FIG. 1 a typical superheat zone of a boiler is illustrated. A pendant type superheater 10 is shown installed between drums 11 of the boiler. Baffles 12 are shown installed on opposite sides of the superheater to provide combustion gas flow from the fire box or combustion chamber over and through the superheater. Such baffles are commonly made of refractory material in order that they will stand up for reasonable periods of time in this zone where temperatures may be of the order of 2500° F. or greater.

The baffles are exposed to the combustion gases. These gases contain particulate matter as well as chemical agents which are highly reactive at temperatures above 1000° F. Both erosion and corrosion effects therefore require frequent repair and replacement of conventional baffles.

Baffles are used in other places in the boilers, of course, but the superheater zone has been chosen for illustration with this invention because that is where the severest operating environment is found. As may be appreciated from the drawing, the superheat zone is a congested one in which maintenance for conventional baffles is a difficult and time consuming operation.

With the baffles 12 of the present invention, frequent repair and replacement is eliminated.

Details of an embodiment of the invention are shown in FIGS. 2 and 3. The baffle 12 comprises a porous outer wall 13 so that a coolant fluid may be circulated through it to cool and protect the outside surface 14 of the wall. The baffle is hollow and comprises one or more interior chambers 15 inside the porous walls.

A plurality of ducts 16 are arranged inside the baffle for receiving coolant from an external source and distributing the same to the chambers 15. Each of the ducts 16 has a plurality of orifices 17 in its side walls through which coolant flows to the chambers 15. Orifices or openings 17 are sized and spaced to provide uniform coolant feed over the surface of the baffle. The orifices and ducts may also be spaced to provide additional coolant supply at those locations where more cooling is needed such as at support brackets or relatively hotter zones in the furnace.

Many common boiler materials may be used for fabricating the baffle wall. The material chosen must have adequate strength so that a thin, light-weight permeable or porous wall can be obtained. A perforated metallic sheet or layers of metallic cloth or mesh may be used. As shown in FIGS. 2 and 3, baffle wall 13 comprises a plurality of layers of woven steel mesh for which conventional 304 stainless steel has been used with good results.

As shown in FIGS. 2 and 3, ducts 16 are welded to the baffle wall not only for holding the ducts in place but also to provide structural support for the baffle itself. Other arrangements are, of course, possible for providing adequate structural rigidity and desired compartmentalization inside the baffle. Plates or stringers may be welded to the walls for this purpose and the ducts may be attached to the same instead of to the walls.

Compartmentalization is necessary to provide proper cooling and coolant economy. With large chambers 15 and no ducts, coolant distribution would be uneven due to external differences in backpressure of the combustion gases on the baffle. To provide adequate cooling over the entire baffle outer surface it would be necessary to raise coolant pressure throughout the system which would increase coolant flow rate through the porous wall 13 to an undesirable level. By using the ducts described, adequate uniform coolant flow can be obtained throughout a given baffle area independently of combustion gas backpressure at other areas and flow rates required are minimal.

As a unit then, the baffle walls, structural members if used, and the ducts define one or more coolant channels for the receipt and distribution of coolant fluid into, and over the outer surfaces of the baffle. The size of particular chambers 15, ducts 16 and orifices 17 are determined by the cooling capacity required at a particular baffle area.

A typical duct or plumbing arrangement may be seen in FIG. 3. The ducts 16 are welded to the porous wall 13, thus dividing the hollow baffle into chambers 15. Ducts 16 are in turn connected to an inlet manifold duct 18. The manifold 18 leads to a portion of the baffle which is near the boiler wall where it is connected to a coolant supply pipe 19. Alternatively, where boiler structure permits, each duct can be arranged to extend through the boiler wall to an external manifold or even to individual coolant supply pipes.

The transpiration cooled baffle of the present invention can be adapted for using many coolant fluids. The fluid may be a gas or a liquid such as air or water. Criteria for selecting a coolant fluid are availability, flow rates required for necessary cooling and chemical reactivity.

Since the cooling system is open cycle with none of the coolant returning to the source, air normally has an economic advantage because of availability. Also, air is very practical for most installations because auxiliary equipment for supplying the same is common and readily available at most steam boiler installations. Flow rates for air can be as low as 15 cubic feet per minute per square foot of baffle area to reduce baffle surface temperature to below 1000° F. in a superheat region. Such a small air bleed will not, for practical purposes, change furnace gas composition and will have essentially no effect on furnace gas temperature.

Air is also advantageous because of its suitable negligible chemical reactivity. This is an essential feature for the coolant fluid. It is necessary not only to assure an extended service lifetime for the baffles but also to protect adjacent boiler apparatus from corrosion.

If a liquid is used, the heat of vaporization absorbed near the baffle surfaces can be utilized to provide additional cooling capacity or permit further reduction in coolant flow rate or both.

With cooling of the baffles as has been described, ordinary structural materials can be used in their manufacture. As has been mentioned, 304 stainless steel mesh is suitable for the baffle walls. The baffles can be fabricated in sections which are light weight and easily assembled and installed.

The coolant flow rate is established so that baffle operating temperature is below that at which chemical agents in the combustion gas stream would cause rapid corrosion. As previously indicated, this temperature should be 1000° F. or less. With proper coolant flow rate, a moving film of coolant will reside at external baffle surfaces at all times. This film advantageously also serves as a buffer for deflecting particulate matter in the combustion gas stream. Thus, frequent erosion and corrosion problems, longstanding troublesome ones with conventional baffles, can be avoided by using this invention.

A particular embodiment of the invention has been described so that it may be thoroughly understood by those skilled in the art. However, it should be understood that the embodiment discussed above is illustrative. Accordingly, the scope of the invention is defined in the following claims.

We claim:

1. A baffle for directing the flow of hot gases which baffle comprises porous outer walls consisting of a plurality of layers of woven steel mesh material and channel means disposed internally of said walls, said channel means including ducts adapted to receive and distribute a coolant fluid, said ducts having a plurality of orifices in the side thereof for distributing said coolant, said means and walls defining passages for the circulation of said coolant internally of said baffle and to the outer surfaces of the same.

2. In combination, a baffle for directing the flow of hot furnace gases and an integral cooling system therefor, said baffle comprising porous outer walls, said cooling system comprising ducts disposed internally of said walls, said ducts being adapted to receive a coolant fluid and having a plurality of orifices in the sides thereof for distributing said coolant, said walls and ducts defining passages for the circulation of said coolant internally of said baffle and to the outer surfaces of the same.

3. For use in a firebox of a boiler, a hollow baffle for directing the flow of combustion gases, said baffle comprising a wall having pores therethrough, a plurality of ducts spaced internally of said wall compartmentalizing the interior of said baffle into channels adapted to convey a fluid coolant, means adapted to connect said ducts to a source of fluid coolant, a plurality of orifices distributed along said ducts, said ducts and channels and orifices co-operating to circulate said coolant fluid from said source to the inner surface of said wall whereby said coolant fluid distributed to said inner surface permeates said outer wall to form on the outer surface thereof a substantially uniformly distributed coolant and protective layer.

4. For use in a firebox of a boiler, a hollow baffle for directing the flow of combustion gases, said baffle comprising a wall having pores therethrough, said wall bounding a laterally extending interior compartment, a plurality of ducts spaced throughout said compartment dividing said compartment into channels adapted to convey a fluid coolant, means adapted to connect said ducts to a source of fluid coolant, a plurality of orifices of predetermined size distributed along said ducts, said ducts and channels and orifices co-operating to circulate said coolant fluid from said source to the inner surface of said wall whereby said coolant fluid distributed to said inner surface permeates said outer wall to form on the outer surface thereof a substantially uniformly distributed coolant and protective layer.

References Cited in the file of this patent

UNITED STATES PATENTS

| | | |
|---|---|---|
| 228,549 | McDonald | June 8, 1880 |
| 600,237 | See | Mar. 8, 1898 |
| 1,360,587 | Said | Nov. 30, 1920 |
| 1,888,975 | Bell | Nov. 29, 1932 |
| 2,253,352 | Seibold | Aug. 19, 1941 |
| 2,277,552 | Kneedler | Mar. 24, 1942 |
| 2,540,231 | Avery et al. | Feb. 6, 1951 |
| 2,605,752 | Hall | Aug. 5, 1952 |
| 2,941,759 | Rice et al. | June 21, 1960 |
| 2,977,106 | Duff | Mar. 28, 1961 |